(12) United States Patent
Makus et al.

(10) Patent No.: US 7,340,472 B2
(45) Date of Patent: Mar. 4, 2008

(54) ORGANIZING AND STORING HIERARCHICAL DATA IN A DATABASE HAVING DUAL STRUCTURES

(75) Inventors: Eric J. Makus, Bellevue, WA (US); Robert L. Usibelli, Seattle, WA (US); Sean M. Usibelli, Fairbanks, AK (US); Edwin Thorne, III, Palo Alto, CA (US); Wayne L. Johnson, Seattle, WA (US)

(73) Assignee: Town Compass, LLC, Seattle, WA (US)

( * ) Notice: Subject to any disclaimer, the term of this patent is extended or adjusted under 35 U.S.C. 154(b) by 436 days.

(21) Appl. No.: 10/839,564

(22) Filed: May 5, 2004

(65) Prior Publication Data

US 2004/0210568 A1   Oct. 21, 2004

Related U.S. Application Data

(62) Division of application No. 09/969,170, filed on Oct. 1, 2001, now Pat. No. 6,757,673.

(60) Provisional application No. 60/238,946, filed on Oct. 9, 2000.

(51) Int. Cl.
*G06F 7/00* (2006.01)
*G06F 17/30* (2006.01)

(52) U.S. Cl. .......................... 707/100; 707/4; 707/102

(58) Field of Classification Search ............... 707/100, 707/102, 103 X, 103 R, 103 Y, 103 Z, 104.1, 707/3, 4; 715/853
See application file for complete search history.

(56) References Cited

U.S. PATENT DOCUMENTS

| 4,829,427 | A | | 5/1989 | Green ........................... 707/4 |
| 5,454,101 | A | * | 9/1995 | Mackay et al. ................ 707/3 |
| 5,619,632 | A | * | 4/1997 | Lamping et al. ............ 345/441 |
| 5,740,425 | A | | 4/1998 | Povilus ...................... 707/100 |
| 5,778,378 | A | | 7/1998 | Rubin .................... 707/103 R |
| 5,864,865 | A | * | 1/1999 | Lakis ..................... 707/103 R |
| 6,055,515 | A | * | 4/2000 | Consentino et al. .......... 705/27 |
| 6,098,034 | A | | 8/2000 | Razin et al. ................... 704/9 |
| 6,202,060 | B1 | | 3/2001 | Tran .............................. 707/3 |
| 6,266,659 | B1 | * | 7/2001 | Nadkarni ....................... 707/3 |

(Continued)

OTHER PUBLICATIONS

Gascoigne, Bamber. 2001. "History Challenge." *History Today*, vol. 21(7), Jul. 2001, pp. 62-63.

*Primary Examiner*—Greta L Robinson
(74) *Attorney, Agent, or Firm*—Ronald M. Anderson (57) ABSTRACT

A data viewer for displaying information selected from hierarchically organized data enables hierarchical searching by displaying hierarchical levels, or alternatively, by implementing an index search of selected data elements. If the index search is selected, an alphabetically ordered list of selected subjects, categories, and subcategories in the database is displayed for the hierarchically organized data. The selected subjects, categories, and subcategories are each associated with a database record and not with a lower hierarchical level that is a category or subcategory. Upon selecting an element from the index, the user is presented with a topical list. Any topic can be selected to display additional information. When an element is selected during an index search, the hierarchical relationship of the selected element to the hierarchical levels above it is also displayed, enabling the user to select a different hierarchical level that appears more relevant to the information desired.

15 Claims, 6 Drawing Sheets

U.S. PATENT DOCUMENTS

| | | | |
|---|---|---|---|
| 6,397,223 B1 | 5/2002 | Kori | 707/102 |
| 6,418,429 B1 | 7/2002 | Borovoy et al. | 707/3 |
| 6,457,018 B1 | 9/2002 | Rubin | 707/4 |
| 6,574,620 B2 | 6/2003 | Borovoy et al. | 707/3 |

* cited by examiner

ORGANIZING AND STORING HIERARCHICAL DATA IN A DATABASE HAVING DUAL STRUCTURES

RELATED APPLICATIONS

This application is a divisional application, based on prior U.S. patent application Ser. No. 09/969,170 filed Oct. 1, 2001, now U.S. Pat. No. 6,757,673 which in turn is a conventional U.S. patent application based on U.S. provisional patent application Ser. No. 60/238,946 filed Oct. 9, 2000, the benefit of the filing dates of which are hereby claimed under 35 U.S.C. §§ 119(e) and 120.

FIELD OF THE INVENTION

The present invention generally relates to a method and system for accessing hierarchically arranged data, and more specifically, to a method and system that enables this type of data to be selectively accessed and viewed in a plurality of different ways on the display screen of a portable computing device.

BACKGROUND OF THE INVENTION

Efficient, quick access to data is one of the driving forces behind the rapid increase in popularity of the World Wide Web and the Internet. However, until access to the Internet via portable devices such as cell phones or personal data assistants (PDAs) becomes more available, more reliable, and sufficiently low in cost, it will generally be preferable to provide access to needed data that are simply stored in the electronic memory of a PDA or other such portable computing device. A relatively large amount of data of interest to an individual can be stored in a few megabytes of memory in such devices. Indeed, so much data can be loaded into memory that accessing a desired portion of the data can be somewhat difficult using conventional browsing techniques or using an indexed data search.

The most logical way to organize data to facilitate rapid and efficient retrieval of desired facts is to first arrange the data in a rational hierarchical structure that is organized along the lines in which people typically think when "zeroing in" on a desired piece of information. It will generally be easier for a user to view a limited number of subjects at the highest level of the hierarchy, select one of the subjects that seems most relevant to the desired information, and then select a category under the selected subject that seems most relevant. These steps can then be repeated one or more times, enabling the access of successively lower levels of the hierarchy, and ultimately should yield the specific information being sought by the user.

While it is possible to organize data in such a logical hierarchical structure so that it can be readily located in the above-described manner, it can sometimes be more efficient to employ an alphabetically ordered subcategory index to locate the desired information. However, a topic that is selected from such an ordered index may be closely related to the desired information, but not include the actual data of interest. Also, note that a subcategory list displayed as a result of an index search may include subcategories that differ from a subcategory list displayed as a result of a hierarchical search.

An example can help to clarify the preceding point. In this example, the data in a database are arranged in a hierarchical relationship and stored in the memory of the portable device. These data include information relating to points of interest, travel, businesses, services, restaurants, etc, for a specific metropolitan city or region. Included under a top level is the subject "Business and Government." Under that subject are second level categories that include the following: "Associations;" "Banks & Brokerages;" "Chambers of Commerce;" "Convention Info;" "Government Information;" "Legal and Courts;" "Major Employers;" and "Shipping and Supplies." A person searching for a financial institution at which to apply for a loan might initially choose the category "Banks and Brokerages," and then choose the next level subcategory "Banks" from a list of subcategories that also includes: "ATM's;" "Brokerages;" "Credit Card Companies;" "Credit Unions;" "Currency Exchange;" and "Travelers Checks." From the list of banks displayed when this subcategory is selected, the user could then choose a desired bank, causing the display of an address, telephone number, and other pertinent information, or the user could move back to the display of subcategories and choose the subcategory "Credit Unions" to list the available credit unions in the region. Thus, the hierarchical categorization of data enables the user to search through the available categories and find the desired data relatively efficiently, but more importantly, it enables the user to choose from among related subcategories so as to ensure that the desired information is readily displayed.

Alternatively, a user may prefer to search for information using an index that lists subcategories alphabetically. In the prior art, selecting a topic such as "Banks" would only result in a list of the banks included in the data being displayed. The hierarchical relationship of the subcategory "Banks," relative to the categories and subjects in the example set forth above, would not be evident from such a list. Clearly, it would be preferable to display the hierarchical category and subject above the subcategory "Banks," since a user would then more readily be able to expand a search into a related subcategory, such as "Credit Unions," to find useful information related to the original index subcategory that was selected. However, since a typical prior art index search does not display the hierarchical levels above a selected index subcategory, the benefits of the hierarchical categorization of the data would be lost by making an index search.

The need to retain and display the hierarchical relationship of data being accessed through an indexed search is particularly relevant to data accessed with a portable device such as a PDA, since such devices have relatively small display screens and can only display a few lines of information at one time. By enabling a user to access hierarchical data through either a hierarchical search or an index search, while retaining and displaying the hierarchical relationships of the data accessed via the index search on the display screen, a user will be able to readily determine if other related subcategories should be viewed to best identify information of interest to the user.

SUMMARY OF THE INVENTION

The present invention is directed to a method for enabling a user to search for a desired data element in a database, using either a hierarchical-based search or an index-based search. A database having a plurality of data elements is stored in a device capable of both accepting a user input, and displaying a result to a user. The user is able to search the database for the desired data element by a hierarchical-based search or an index-based search. In response to a user's selection, a desired data element is displayed to a user, such that a hierarchical relationship of the desired data element to other data elements in the database is also displayed to the a user. Particularly when a user has employed an index-based search, the simultaneous display of the selected data element and hierarchical relationship of the data element to other data elements in the database offers the user the ability to determine, based on the hierarchical relationships displayed, if a different, yet related data element more closely matches a result a user desired. In at least one embodiment, the device is a handheld device, such as a cell phone, a pager, a personal digital assistant, or other compact computing device.

The hierarchical relationship that is displayed is at least a title of hierarchical level that is at a higher level than that to which the desired data element belongs. Preferably, if space on the display permits, all higher hierarchical levels are displayed. If it is not possible to display all higher hierarchical levels, then at least the next two higher levels (relative to that of the desired data element) are preferably displayed. In at least one embodiment, the bottom level of the hierarchy represents database records, a top level of the hierarchy represents a subject level, a second from the top level of the hierarchy represents a category level, and a second from the bottom level of the hierarchy represents a subcategory level.

Preferably, when a data element from the index is displayed, both the subject level and category level are also displayed. When the data element displayed is a database record, the related subject level, the category level, and the subcategory level are also preferably displayed.

In at least one embodiment, when a user has selected a hierarchical-based search, then the user is enabled to navigate the hierarchy, selecting a subject, a category, and a subcategory. While it is anticipated that most databases will include subject, category, and subcategory levels, small databases may be organized using subject and category levels. Also, larger databases may be organized using subject, category, and multiple levels of subcategories.

When a user has selected an index-based search, then the user is enabled to select an item from an indexed list that represents a hierarchical level, which is associated with no lower hierarchical levels, other than database records. The bottom level of the hierarchy represents the data records (names, telephone numbers, addresses, image data, etc.). Depending on the depth of the hierarchy, the next highest level might be either a subcategory, a category, or even a subject. For example, in some hierarchical databases, one element in a first hierarchical subject level might lead to three category elements in a second hierarchical category level. Of those three category elements in the second hierarchical category level, one category element may not have any subcategories associated with it. Selecting that category element would result in the listing summarizing all related data from the lowest hierarchical level (i.e., the database records). Thus, that category element represents a hierarchical level, which is second from the bottom of the hierarchy, and as such, that category element would be included in the index. Similarly, if selecting a particular subcategory element leads to the display of additional subcategories, rather than the listing summarizing the data from the lowest hierarchical level, that particular subcategory element does not represent a hierarchical level second from the bottom of the hierarchy. Therefore, that particular subcategory would not be included in the index. When a category or a subcategory is selected from the indexed list, the higher hierarchical levels for that category or subcategory item are also displayed. It should be understood that this concept extends to the first hierarchical subject level as well. While in most hierarchical databases, selecting a subject element from the first hierarchical subject level will lead to the display of at least one category element from a second hierarchical category level, it is conceivable that instead, selecting that subject element would result in the display of a listing summarizing the related data from the lowest hierarchical level. In rare circumstances, a subject element from the first hierarchical subject level can also represent a hierarchical level second from the bottom of the hierarchy and would be included in the index.

Once a user has selected a data element whose hierarchical level represents the second lowest level of the hierarchy (i.e., a data element that is a subject element, a category element, or a subcategory element, and whose selection does not result in the display of one or more category elements or a subcategory elements), a listing summarizing all database record corresponding to that data element is displayed, along with related higher hierarchical levels of the data element. A selection can be made from that listing, resulting in a display of a specific database record.

Preferably the database used in conjunction with the present invention includes a dual data structure comprising a first tree data structure that defines a hierarchical relationship between the plurality of data elements in the database, and a second data structure comprising an ordered array. The first tree data structure includes at least one pointer associated with any node having at least one of a first child, a next sibling, and a parent, such that for each such node, the pointer refers to any one of the first child, the next sibling, and the parent associated with that node. Such a tree data structure preferably includes at least two types of nodes, a first hierarchical type of node comprising at least one of a subject node, a category node, and,a subcategory node; and a second data record type of node comprising either an individual data element or a database record.

The ordered array is generated from the contents of the hierarchical level that is immediately adjacent to the lowest hierarchical level of the hierarchy described in the tree data structure. The contents of the ordered array are organized in a desired order. In at least one embodiment, the ordered array is alphabetized. Preferably the ordered array is stored in a memory associated with the computing device, in a sequential order corresponding to the desired order.

In another embodiment, an attribute is assigned to each element of the ordered array and defines a position of each element in the ordered array, such that the attributes are used to determine an order with which each element of the ordered array is displayed to a user.

The dual data structure enables a user to make a selection from a plurality of hierarchical ranked subjects, to make a selection from a plurality of hierarchical ranked categories based on a user selected subject, to make a selection from a plurality of hierarchical ranked subcategories based on a user selected category, and to make a selection of a subcategory from a plurality of indexed subcategories. Preferably the desired data are read in place.

In at least one embodiment, a user can add data related to the database. Preferably the user added data are stored as a separate database, and not incorporated or integrated into the indexed array data. When a user selects a hierarchical level associated with a user added data element, the data element is displayed at a top of a list of data elements associated with the hierarchical level selected by a user. By separating the user added data, both the tree data structure and the ordered array can be updated or moved to a different device without changing or simultaneously moving the user added data.

Another aspect of the present invention is directed to an article of manufacture adapted for use with a computing device. The article includes a memory medium and a plurality of machine instructions stored on the memory medium, which when executed by a computing device, cause the computing device to carry out functions generally consistent with the steps of the method described above. Such memory media can be either or both integral to the article, or a removable memory media.

Yet another aspect of the present invention is directed to a system having a memory in which a plurality of machine instructions are stored, a display, a user input device, and a processor that is coupled to the display and to the memory to access the machine instructions. The processor executes the machine instructions and thereby implements a plurality of functions that are generally consistent with the steps of the method described above.

Still another aspect of the invention is directed to a database having a dual data structure. The elements of the dual structure for the database are generally consistent with above description.

A still further aspect of the present invention relates to a method for producing a dual data structure from unorganized data. The unorganized data are first grouped into a plurality of data elements, preferably into database records. Then, hierarchical relationships between the plurality of data elements are generated, preferably including a top subject level, an intermediate category level, and a subcategory level. The tree is constructed such that a top level of the hierarchy is a subject level, a second level of the hierarchy is a category level, a third level of the hierarchy is a subcategory level, and a bottom level of hierarchy corresponds to records of the data. As the tree data structure is constructed, the pointers described above are included. An ordered array is generated based on those data elements of the subject level, the category level, and any subcategory levels that are not associated with a lower category level or subcategory level. Such data elements are only associated with a lower hierarchical level that includes the database records, and as such, those data elements (regardless of whether they are elements of the subject level, the category level, or a subcategory level) can be considered to be immediately above the level of the records. The array is ordered according to a desired ordering paradigm, such as alphabetically, or hierarchically.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention is a data viewer intended to be run on virtually any computing device. In an initial preferred embodiment, the present invention will be run on a PDA device such as one of the PALM™ devices currently sold by Palm Inc., and software to implement the invention is being marketed as the "TOWN COMPASS™ DataViewer." However, it is not intended that the invention in any way be limited to software that is executable only on a PDA of that type, or limited only for use on a PDA, or handheld computing device, since it is also contemplated that the present invention can be run on almost any computing device with a central processing unit (CPU) or other type of processor, and a display screen for viewing data. For example, the present invention can also be readily modified to execute under Microsoft Corporation's WINDOWS CE™ operating system on a Pocket PC, or on either a notebook, desktop, workstation, or other type of computing device running any of a variety of different operating systems.

Figures 1A, 1B, 1C, 2:
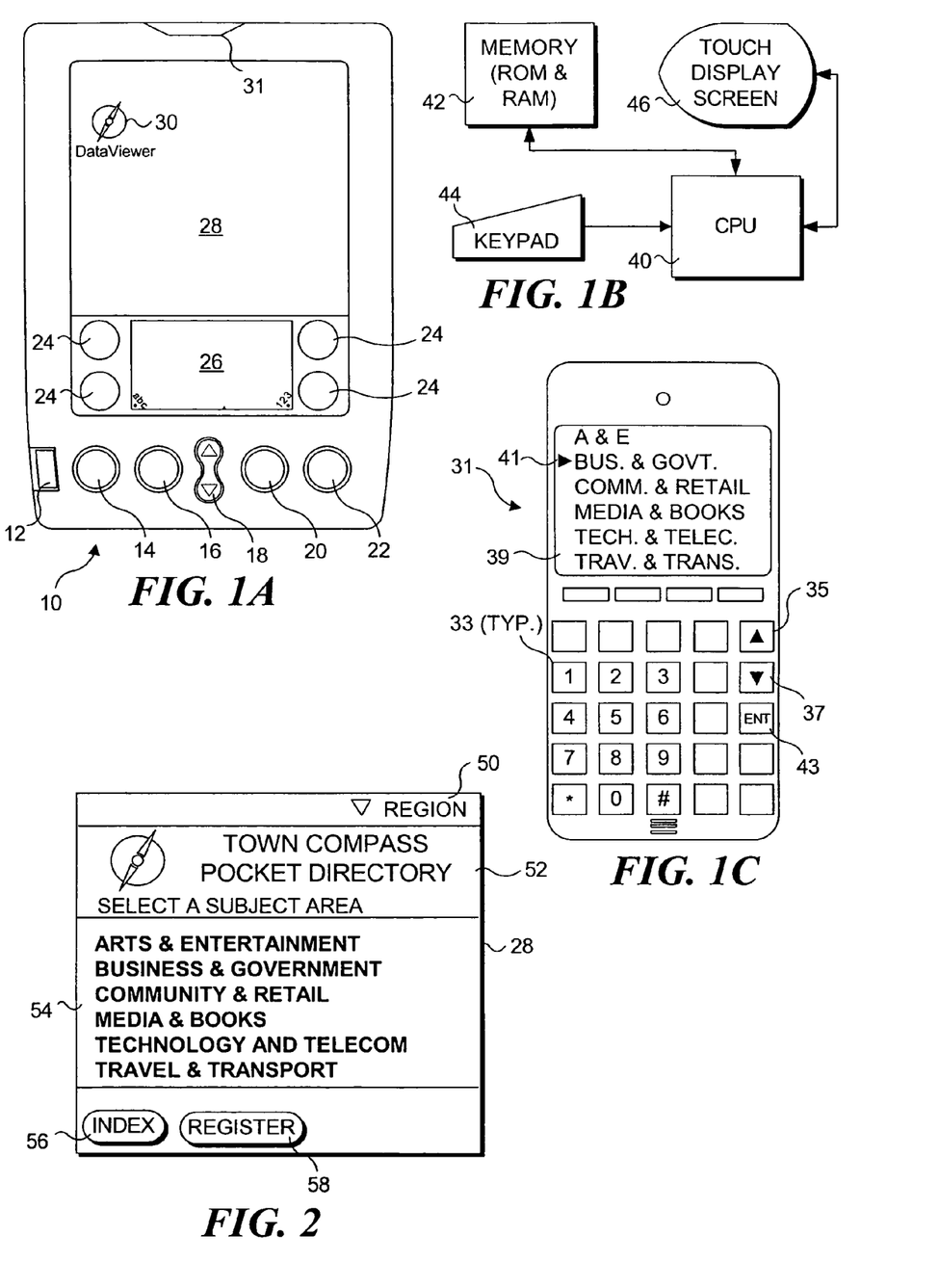
FIG. 1A illustrates a first exemplary computing device (i.e., a PDA) suitable for use in carrying out the data viewer of the present invention.
FIG. 1B illustrates a functional block diagram of the PDA of FIG. 1A.
FIG. 1C illustrates a second exemplary computing device (i.e., a cell phone with Internet connection capability) suitable for use in carrying out the data viewer of the present invention.
FIG. 2 illustrates an exemplary top-level subject listing of data relating to a specific community or region.

FIG. 1A illustrates a PDA 10, which is suitable for running an initial embodiment of the present invention, useful for displaying hierarchically organized data. In an exemplary application of the present invention, PDA 10 is used for displaying data for a community or region that might be of interest to a resident and which would be particularly helpful to a tourist or other visitor. However, it is again contemplated that many other types of hierarchically organized data can readily benefit from the present invention, which enables the hierarchical relationship of a selected sublevel of the data to be viewed, even when the sublevel of the data is initially accessed through an index search of all such sublevels of the data.

PDA 10 includes a power-on button 12 and a plurality of keypad buttons for directly accessing functions provided with the PDA, including a calendar button 14, an address/telephone list button 16, a to-do list button 20, and a memo list button 22. A scroll toggle button 18 is included for scrolling or moving between various menu options being displayed.

PDA 10 also includes a display 28 from which displayed items can be selected by touch using a fingertip or stylus. On the lower portion of the touch screen are included a plurality of touch screen buttons 24 for directly accessing a home display, a drop-down list menu, a calculator, and a search function. A region 26 is provided in the lower portion of the touch screen for entry of alphanumeric symbols with a stylus (not shown). The upper portion of display 28 is used for displaying information dependent upon the particular function or application that is currently being executed, and for displaying icons for applications or functions that can be selected by the user for execution. When installed on PDA 10, the embodiment of the data viewer displays an icon 30 on display 28, which can be selected to initiate the data viewer function, and subsequently, to open an "about screen." PDA 10 preferably includes a data port 31, useful for transmitting data to and from PDA 10. As those of ordinary skill in the art will recognize, infra red (IR) data transmission can be employed to transfer applications and data to and from a computing device. Accordingly, in at least one embodiment, data port 31 is an IR port. Other types of data ports, such as a parallel port, a serial port, and/or a universal serial bus (USB) can also be included in PDA 10. It should be understood that more than one data port of the same or different types can be included in PDA 10.

FIG. 1B illustrates the primary functional components employed in PDA 10 to execute the present invention and to carry out other functions and applications provided on the PDA when purchased, or when subsequently loaded into its memory. The present invention is distributed as a program (machine instructions) that is loaded and stored in a non-volatile memory of the PDA. A CPU 40 is included for executing machine instructions that are stored within a memory 42. Memory 42 includes both read only memory (ROM), i.e., the non-volatile memory in which machine instructions for executing the present invention are stored, and random-access memory (RAM)—neither of which is separately shown. A keypad 44 includes the hardwired keys illustrated in the lower portion of FIG. 1A. A touch display screen 46 is bi-directionally connected to CPU 40 to enable entry of user options selected by touching display 28, and also for displaying data and other information. It will be understood that display 28 comprises a primary portion of touch display screen 46. Other components used within PDA 10 are not illustrated, since they are not particularly important in regard to the present invention, and their use in connection with the operation of PDA 10 or other computing devices suitable for executing the present invention is well-known by those of ordinary skill in the art.

FIG. 1C illustrates a cellular telephone 31 that includes keys 33 used for dialing a number and for entering other commands and options. While not required, cellular telephone 31 is capable of connecting to the Internet and includes browsing capability. And up cursor control key 35 and a down cursor control key 37 control a cursor 41 to select among options appearing on a display screen 39. Since display screen 39 is relatively small, the text included therein is typically abbreviated. (FIG. 2 illustrates a non-abbreviated identification of the subject areas shown in this exemplary listing.) Using up cursor control key 35 or down cursor control key 37, a user can move cursor 41 so that it is adjacent to a desired subject, category, subcategory, or other option, and then press enter key 43 to select the desired item. Further details relating to the use of cellular phone 31 for displaying hierarchical data and searching the data either hierarchically or through an index search are explained below, in connection with PDA 10.

FIG. 2 illustrates an example of a highest-level listing of subject areas included within an exemplary hierarchical database relating to information for a particular region 50, which is selected when the present invention is initially executed. Optionally, a user can change between a plurality of hierarchical data sets while executing the data viewer, without exiting the viewer. In one embodiment, switching databases can be accomplished by selecting region 50, which causes a drop down list of other databases to be displayed to the user. Thus, in accord with the present invention, the user can selectively search and view data for different regions or can search and view entirely different types of data that have no relationship to the example discussed below.

A variety of different hierarchical databases covering diverse subjects are being developed for use with the data viewer in accord with the present invention. These subjects include, but are not limited to, the following: college ranking data, used car data like that in the KELLY BLUEBOOK™ reference, business ranking data, demographic data, data ranking consumer goods, recipe data, political data, sports data, drug or pharmaceutical data, real estate data, and almanac data. It is likely that these and other subjects arranged in hierarchical databases usable with the present invention will be available for download over the Internet. An Internet web site, "pocketdirectory dot com", currently lists a number of such databases for use with the present invention. Depending upon the circumstances, a hierarchical database usable with the present invention may be purchased at this site (or from other sites), or may be provided to users at no charge. It should be noted that the term POCKET DIRECTORY® is a trademark of Town Compass LLC.

Referring once again to the example shown in FIG. 2, a heading area 52 indicates that a "Town Compass Pocket Directory Database" embodiment of the present invention has been selectively executed on PDA 10 for the selected region 50. When initially running the Town Compass Pocket Directory Database, the user is given an opportunity to select from one of the highest-level hierarchical subjects 54 listed on display 28 to "burrow in" to a desired piece of information by selecting successively lower hierarchical levels that seem relevant to the desired information. Alternatively, the user can select a control or menu such as a touch control index button 56 to open an index that facilitates an index search of subcategories of the data, as explained below. Optionally, a menu or other control element such as a touch control button 58 can be selected to register the software that executes the present invention.

In the example shown in FIG. 2, only six top-level hierarchical subjects are illustrated, but it will be understood that either more or fewer subjects could be included. If more subjects are included at the top level of the hierarchy than can be viewed at one time on display 28, an up or down arrow tab will be provided on the side of the display for accessing those subjects not currently visible.

Figure 3:
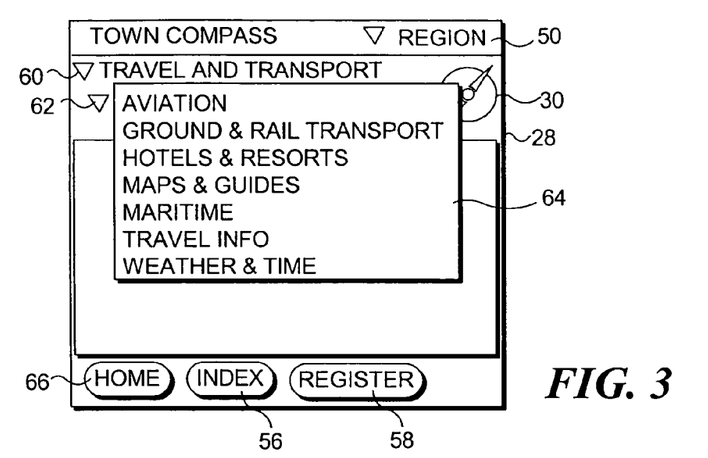
FIG. 3 illustrates an exemplary second-level category listing of the hierarchical data of FIG. 2.
Figure 4:
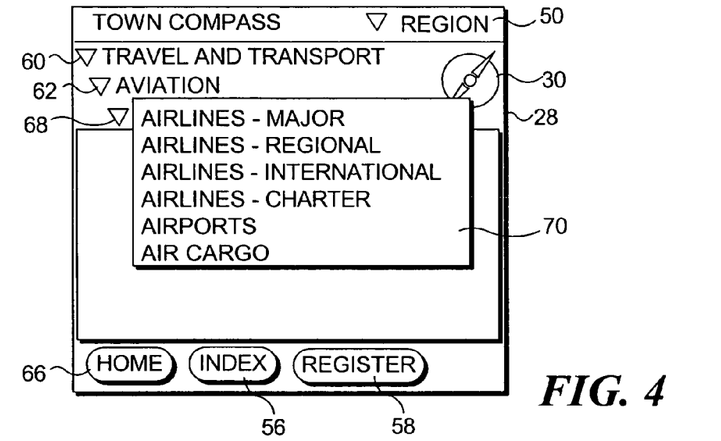
FIG. 4 illustrates an exemplary third-level subcategory listing of the hierarchical data of FIGS. 2 and 3.
Figure 5:
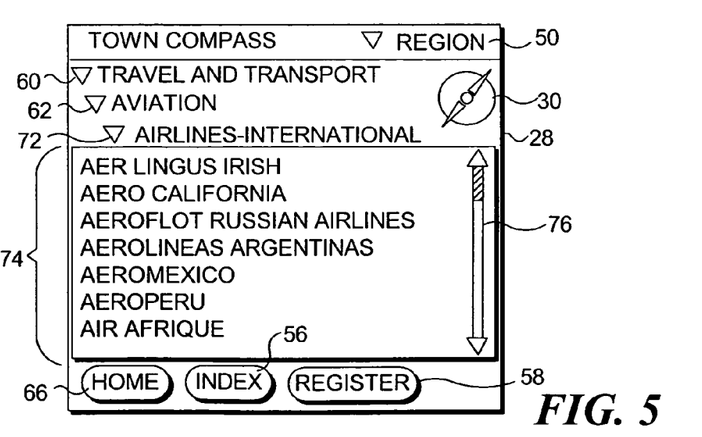
FIG. 5 illustrates an exemplary list of the data for one of the third-level subcategories from FIG. 4.

With regard to FIG. 3, a user has selected a subject 60 labeled "Travel & Transport," causing a list 64 of second-level categories 62 to be displayed. The user can employ a finger or a stylus to select from among the second-level categories. If the category "Aviation" is selected, a list 70 of third-level subcategories 68 is displayed, as shown in FIG. 4. In this view and others, the successively indented position of triangles in the display indicate the hierarchical relationship of levels. Any of the third-level categories can be selected by touching the subcategory on display 28 with a finger or stylus. For example, as shown in FIG. 5, the user has selected a third-level subcategory 72 entitled "Airlines—International," causing a list 74 of international airlines to be displayed. Since more international airlines are included within list 74 than can be displayed in the available space on display screen 28 at one time, a scroll bar 76 is included for selectively accessing other international airlines in list 74 that are not currently shown. From any of the international airlines thus accessed and shown in the display, the user can select a desired international airline, causing further information about the selected international airline to be displayed. An example of this selection and the type of information displayed are discussed below. Note that listing 74 does not represent yet another listing of subcategories, but is instead a summary of the information in the database records that are associated with the selected subcategory (or subject, or category, depending on the depth of the hierarchy). In the present example, the subcategory is "international airlines," and the summary provided by listing 74 includes the names of all of the international airlines for which data are stored in a database record accessible on the PDA. Note that a user can exit from the hierarchical search by selecting region 50, which enables the user to select a different hierarchical database for viewing with the present invention. The user can access the other database and then can return to the present database by again selecting region 50.

Figure 6:
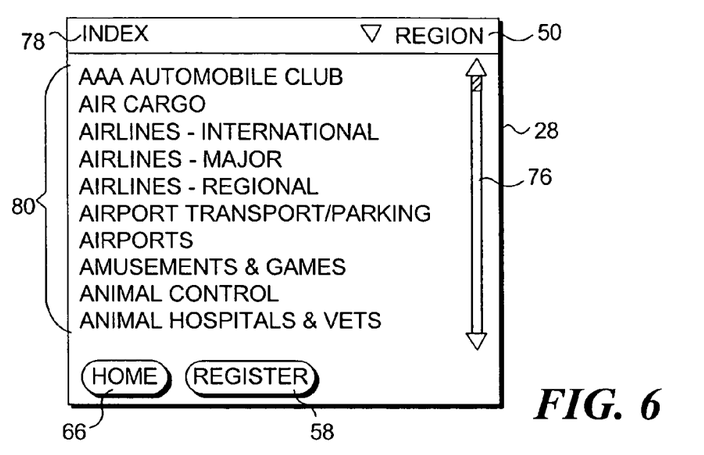
FIG. 6 illustrates an exemplary first page of a scrollable index of the categories and subcategories of the data in the example of FIGS. 2-5, in which all of the second-level categories without subcategories, and all of the third-level subcategories in the data are alphabetically listed.

With reference to FIG. 6, an alternative approach for accessing information is illustrated for the above topic. In this approach, the user has selected the index option, as indicated by a heading 78. This alternative is selected by touching touch control index button 56 with a finger or stylus. When the index option is thus selected, the present invention causes an index 80 of all of the second-level categories in the hierarchical database that have no third-level subcategories, and all of the third-level subcategories in the hierarchical database, to be displayed. Since there are likely many such categories and subcategories, scroll bar 76 is employed to enable the user to access those categories and subcategories that are not currently shown on the display. At any time, the user can selectively return to the home screen of the data viewer by selecting screen button 66.

Figure 7:
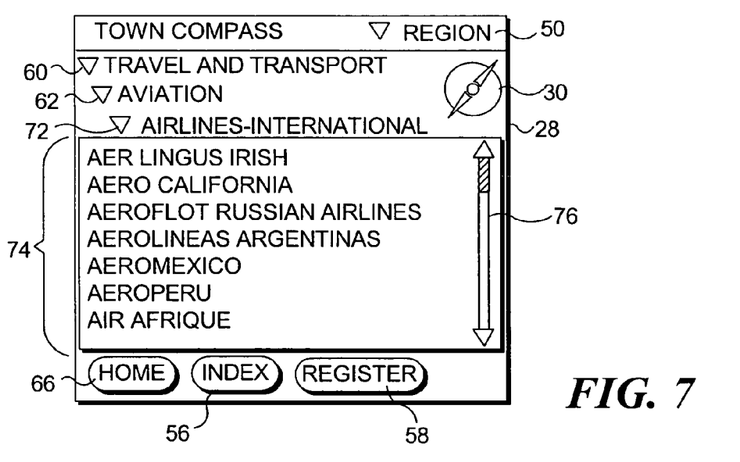
FIG. 7 illustrates the display of a selected subcategory achieved by the index search, showing how selection of one of the categories or subcategories in the alphabetical index causes the corresponding top-level subject and any intermediate category for the selected subcategory to be displayed.

The third item currently shown in the list of third-level subcategories in FIG. 6 is "Airlines—International." By selecting that subcategory, the screen shown in FIG. 7 is provided on display 28 and is essentially identical to that shown in FIG. 5, which was obtained by burrowing down through the hierarchical levels to display the list under "Airlines—International." However, unlike traditional index-based searches, the present invention displays the hierarchical relationship between the selected third-level subcategory and the higher levels, as shown in FIG. 7, just as in FIG. 5. As a result, the user can more readily determine the relationship between the selected topic and other possible topics of interest that might lead to the display of more relevant information of interest. Enabling a user to be more readily and easily find relevant information than can be obtained by a purely hierarchical or alphabetical search is an important advantage of the present invention.

Figure 8:
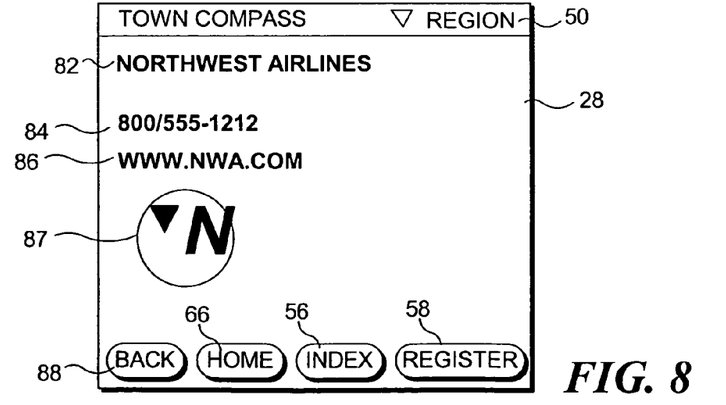
FIG. 8 is an exemplary display of information, including images, for a specific selected topic under one of the subcategories, i.e., the information for a selected airline.

In the present example, if the user is satisfied with the listed international airlines provided in either FIGS. 5 or 7, the user can select one of the airlines. As shown in FIG. 8, the user has selected an airline 82, identified as "NORTH-WEST AIRLINES™," causing display 28 to show pertinent information, including a telephone number 84, an Internet address (or universal resource locator (URL)) 86 for the selected airline, and a logo 87. The data that are displayed can include text, numbers, URL's and images. Preferably, telephone numbers and URL's (including electronic mail addresses) are "hot," meaning that selecting the telephone number or URL results in the application executing an appropriate action, such as dialing the telephone number, or accessing the URL. Included at the bottom of display 28 is a touch button 88 entitled "Back" that enables the user to return to the previous list of international airlines 74 shown in either FIGS. 5 or 7.

While the information displayed in FIG. 8 in response to the selection of an element from list 76 (or list 74) generally represents a database record, it should be understood that the information displayed in this Figure (i.e., the URL, the phone number, the airline name, and the airline logo) need not be stored together. Each element in list 74 and list 76 includes pointers to all data to be displayed on the display page of FIG. 8. Because of their relatively large size, images in particular are generally stored separately. For example, an airline logo for a major carrier may be associated with two different database records, such as domestic airlines and international airlines. Rather than storing the image twice, selecting an element from listing 74 or 76 will activate a pointers to the appropriate stored image, so that it can be displayed.

If the user decides that a different subcategory under aviation (other than international) would be more likely to provide desired information, using the touch screen, the user can select third-level subcategory 72, returning to the hierarchical display shown in FIG. 4. At this point, the user may determine that the third-level subcategory entitled "Airlines—Major" is really the area of interest, and if selected, the present invention will display a list of major airlines from which the user can choose by touching the name of a desired major airline with a finger tip or stylus, causing the display of pertinent information for the selected major airline, generally corresponding to that shown in FIG. 8.

Thus, by providing a hierarchical listing of the subjects, categories, and subcategories included in the database to enable the user to search for information by working through the levels of the hierarchy, as well as by providing an index search that also displays the relevant hierarchical levels above a selected subcategory, the present invention greatly facilitates the options available to a user to refine a search. The display of the hierarchical relationship for either a second-level category that has no related third-level topic, or a third-level topic, selected by doing an index search, greatly facilitates the ability to access desired information.

Figure 9:
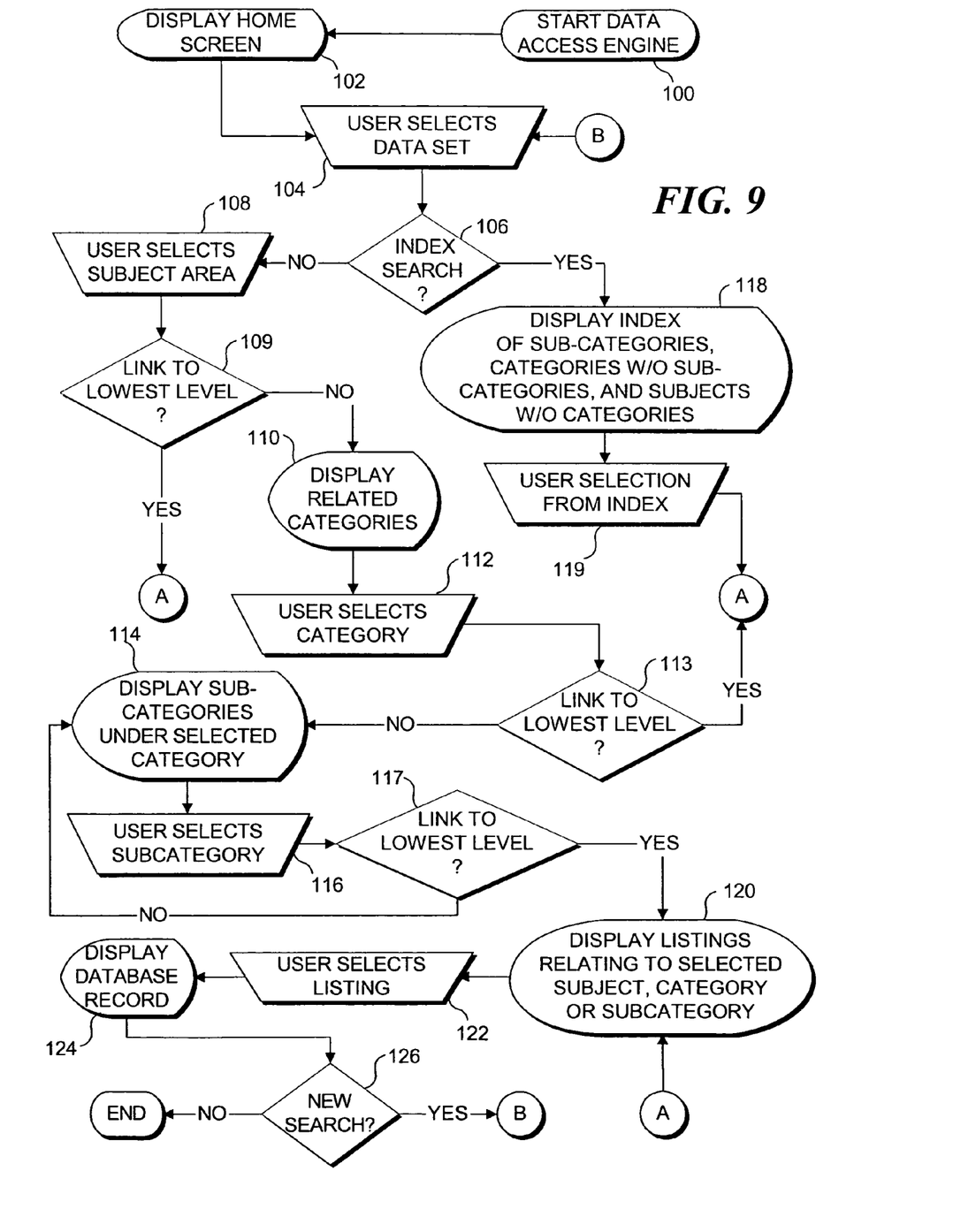
FIG. 9 is a flow chart illustrating the logical steps implemented in carrying out the present invention.

FIG. 9 illustrates details of the logic employed in implementing the present invention to enable a user to carry out either a hierarchical search of a database or a search based upon an index of all subcategories (or of the topics at a different level in the hierarchy). The logic for the present invention is initiated in a block 100 when the user causes a data access engine to be started by, for example, selecting an icon for the data access viewer. In response, as noted in a block 102, the data access engine causes the display of a home screen for accessing and displaying hierarchical data. As indicated in a block 104, the home screen enables the user to select a hierarchical database to be searched, giving the user an option to access alternative databases with the data viewer.

Once the user has selected a data set, for example, a specific region in the above example, for which information is to be accessed, a decision block 106 determines if the user has selected an index search rather than a hierarchical search. If an index search was not chosen, the user will select a subject area from the highest-level subjects displayed, as indicated in a block 108. The logic will first determine, via a decision block 109, whether the subject selected by the user will result in the display of a list summarizing the related database records, or the display of one or more categories related to the subject. Note that the database records are at the lowest hierarchical level, so that subjects that result in the display of a listing summarizing the most related database records can be considered to be linked to the lowest level of the database.

Generally, most subjects selected by a user will be linked to categories, each of which may be linked to one or more subcategories. However, it is possible that some databases will include one or more subjects that are linked to no lower hierarchical levels (i.e., categories and subcategories) but which when selected will generate a listing summarizing relevant information stored within the database. It should be noted that this is likely to be a somewhat unusual occurrence, since if all subjects have no related categories, then the resulting data structure becomes simply an index (each subject having a one to one correspondence with a database record), rather than a hierarchical data structure. Thus, the subject selected in block 108 is either linked to the lowest hierarchical level where the data are stored (as database records), or the subject selected in block 108 is linked to a category classification (i.e., a hierarchical level that is lower than the subject level classification, but higher than the lowest level where the data are stored), which includes categories related to the selected subject. If in decision block 109, it is determined that the selected subject does not link to a category (in other words, that the selected subject links to the lowest level of the hierarchical database, i.e., to a database record, such that the "yes" branch is to be followed), then the logic proceeds (via connector A), to a block 120, and a listing summarizing the most closely related database records is provided. This information corresponds, for example, to the list displayed for all international airlines included in the database, as illustrated in the example noted above in FIG. 7.

Most often in block 109, it will be determined that the selected item does not link to the lowest level of the hierarchical database (i.e., to a database record), such that the "no" branch from block 109 is followed, and the categories related to the selected subject will be displayed, as indicated in a block 110. These categories correspond to the second hierarchical level of the data set. A block 112 enables the user to select one of the displayed categories.

In a decision block 113, the logic determines if the category selected is related to lower level subcategories. As noted above, some categories (and perhaps some subjects) are not linked to lower hierarchical levels other than the lowest hierarchical level in which the database records reside. If in decision block 113 it is determined that the answer to decision block 113 is "yes" (i.e. the category selected in block 112 is linked to the lowest hierarchical level instead of to a subcategory level), then a listing summarizing the related database records is displayed in block 120 as shown via connector A. If it is determined that the answer to decision block 113 is "no" (i.e. the category selected in block 112 is directly linked to at least one subcategory and not linked to the lowest hierarchical level), then those subcategories are listed in a block 114.

In a block 116, the user selects one of the subcategories that seems pertinent and relevant to the information that the user wants to access. Then, in a decision block 117, the logic determines if the selection made by the user in block 116 is related to a lower level subcategory, or to at least one database record from the lowest hierarchical level. If in decision block 117, it is determined that the answer is "no," in other words, the subcategory selected in block 116 is directly linked to one or more lower level subcategories as opposed to being linked to a database record, the lowest hierarchical level, then those subcategories are listed in a block 114. The cycle of displaying and selecting subcategories is repeated until in decision block 117, it is determined that the answer is "yes," in other words, the subcategory selected in block 116 is linked to one or more database records, the lowest hierarchical level instead of to yet another subcategory level. At that point, a listing summarizing the related database records is displayed in a block 120.

Once the listing of block 120 is displayed, the user selects a specific item in a block 122 (corresponding to the selection of international airlines as illustrated in FIG. 8). The corresponding specific database record is then displayed (see FIG. 8) in a block 124. After the user has completed a review of the database record displayed in block 124, the user can either select a new search or terminate the application, as indicated in a decision block 126. If a user decides to initiate a new search, the user is returned to block 104 (via connector B) and is enabled to select a data set (the same database or a different database). If in response to decision block 126 the user elects to terminate the application, the application terminates.

Alternatively, if the result in decision block 106 is affirmative, based upon the user's decision to carry out an index search, the screen displays an index listing all of the subject-level categories that have no second-level categories, all of the second- level categories that have no third-level subcategories, and all of the third-level subcategories that have no lower-level subcategories (and all other lower-level subcategories that have no still lower-level subcategories), as provided in a block 118. Any element from a subject level, a category level, or any subcategory level whose selection would result in the display of a listing that summarizes the related database records (each database record having, for example, information such as text, addresses, phone numbers, URL's and images) is preferably included in the index.

From the indexed elements (most often categories and subcategories, but sometimes subjects), the user selects a desired category or subcategory (or subject), as noted in block 119. From block 119 (via connector A), the logic displays the listing summarizing the data records most closely related to the selected element. As described above, the user selects a specific database record in decision block 122, and that record is displayed on a display page (see FIG. 8) in block 124. After Once a user has viewed the displayed database record, the user can decide to perform a new search, or exit the application, at decision block 122.

From the above description of the logic, it will be noted that block 120 is reached whether the user chooses to make a hierarchical search for information, or alternatively, to search using the index of subcategories. In either case, the present invention not only displays the topic listings under a selected subcategory, but also displays the hierarchical relationship of that subcategory to the higher-level category and subject area. As a consequence of displaying this hierarchical relationship, the user has the option to modify the results of the search obtained in either manner to access different subcategories, and to thereby obtain the actual desired information.

Dual Data Structure

To facilitate the searching of data using either a hierarchical search mode or an index search mode in which the hierarchical relationship of the results is displayed to the user, the preferred embodiment of the present invention employs dual data structures. It is important to note that when the present invention is executed on a computing device with limited memory and processing capabilities, the organization of the data structure must be very compact and efficient. Computing devices such as cellular phones and PDAs typically do not include a non-volatile memory device (like a hard drive) for storing data separate from the memory used in executing software. The data that are viewed in the present invention are intended to be "read in place," rather than being loaded from a separate storage memory into executable memory. The dual data structure used for storing data of the hierarchical database is thus optimized for such a computing device.

Figure 10:
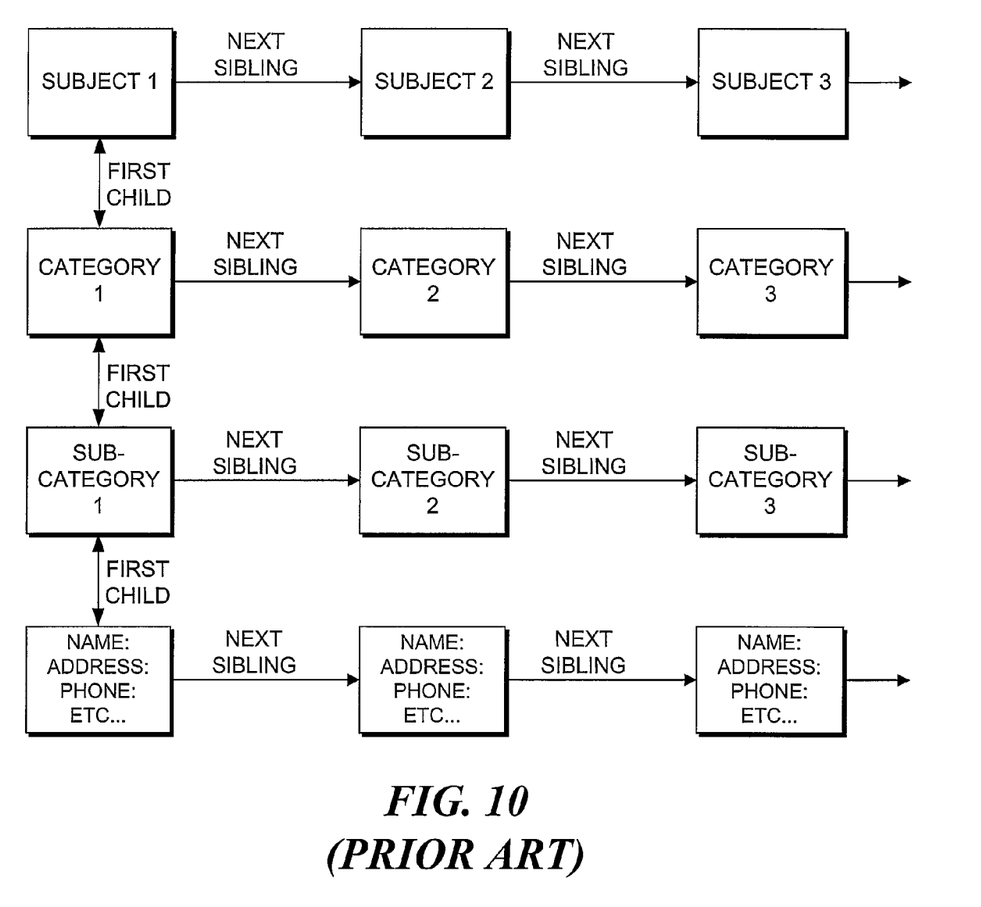
FIG. 10 is a block diagram illustrating a portion of a hierarchical database with which the present invention is usable.

The hierarchical relationship between data elements in the hierarchical database used in the present invention is defined by a tree data structure, generally as shown in FIG. 10, while the subcategories (or the lowest categories in the hierarchy, if not a subcategory) used in the index search are organized into an ordered array that is presorted in alphabetical (or other desired) order. The hierarchical tree data structure shown in FIG. 10 is generally conventional, with each node having pointers to its first child (if any), next sibling (if any), and to its parent (if any). These pointers do not necessarily point to a node that is immediately adjacent in memory, as might improperly be inferred from the layout shown in FIG. 10. The pointers facilitate accessing the data in the tree structure for display of the hierarchical relationship between the nodes based upon an address of the data for a node in the memory. During a hierarchical search, the software enables a user to simply "walk" through the tree by making selections at each level of the hierarchy, and using the pointers to locate the selected node, the data at that node are displayed to the user.

Since the subcategories of the data that are searchable in an index search are presorted in alphabetical order to form an array (not shown in FIG. 10) comprising a portion of the hierarchical data tree, the index search is carried out relatively rapidly. It should be understood that the contents of this array are not a copy of the lowest subcategories included in the index, but instead, are simply those subcategories listed in the sorted order required for making an index search. Since each node of the subcategories included in the index is provided with pointers to its first child (if any), next sibling (if any), and parent (if any), the position of these subcategory nodes in the hierarchical tree is not important, but the position of these nodes in the ordered index array is. Thus, the ordered index array is stored sequentially in memory to facilitate the ordered list of the subcategory nodes during an index search. As an alternative to organizing the subcategory nodes in the correctly sorted alphabetical (or other predefined) order in memory, for display of the index array, an index order attribute could be provided to each of the subcategory nodes in the index to define that node's position in the ordered array, sorted as desired. The index order attribute would then be applied to determine the order in which each subcategory node is displayed in the list during an index search. However, the preferred method for storing the sorted subcategory nodes in memory in the desired order reduces the processing time required when displaying the index array.

The portion of the array of subcategory nodes that is displayed on the screen during an index search is readily updated as the user scrolls through the array, based upon the position of the slider in the scrollbar, the total number of subcategories in the array, and the location of the first subcategory node. Furthermore, the display of the hierarchical relationship of any selected node is easily provided, since the selected node includes the pointers to its parent and siblings, and each parent includes the pointers to its parent and siblings.

It should be noted that FIG. 10 shows a data tree that includes hierarchical levels representing both categories and subcategories. The ordered array is always selected from the hierarchical level that is closest to the lowest level of the data tree. In FIG. 10, this second lowest level is labeled Subcategory. Depending on the number of levels in the tree, the second lowest level could also be Subcategory A (not shown, but representative of a tree with five levels, as opposed to the four levels shown in FIG. 10), or even Category (representative of a tree with only three levels, as opposed to the four levels shown in FIG. 10, i.e., the tree of FIG. 10 with no Subcategory level). Regardless of the number of levels in the data tree, the records that include the specific information of interest to a user always reside at the lowest level of the data tree, and the ordered index array always is derived from the hierarchical level closest to the bottom level of the tree (i.e. the second lowest level).

Another feature that is expected to optionally be provided with the present invention will enable users to enter additional data in a user database corresponding to the data in a hierarchical database supplied to the user. The hierarchical database supplied to a user is referred to hereinbelow as a "product" database, since it will likely be sold (or otherwise provided) to the user as a commercial product. Data in the user database, which is created when the user registers the product database, is developed as the user adds data records under any selected lowest subcategory in the hierarchical database. Because the records added by the user are not at a subcategory level, they do not need to be included in the index array that is searched and only require a pointer to the subcategory under which they have been added and will be accessed.

An example will help to clarify how this user database feature operates. Assume that a user who purchased a Seattle region hierarchical database has (a) selected the subject "Arts & Entertainment;" (b) has selected the category "Restaurants" under that subject; and (c) has selected the subcategory "Eastside," producing a list of restaurants that are in the database for the Eastside. However, the user notes that a newly opened restaurant located in the Eastside is not included in the data of the product database. The user will be provided a menu option to "Add a Record" when a list of options is displayed under a selected level. By choosing the option to add a record, a dialog box will be displayed in which the user can enter the name of the restaurant, its address, and its telephone number. Records added to the user database for a given subcategory will thereafter be automatically displayed at the beginning of the list of topics for that subcategory. Thus, the new restaurant on the Eastside entered by a user in the user database will now be displayed at the top of the list of Eastside restaurants.

The user database is stored separately from the product database so that an update to the product database will not affect the user database. Since the registration number of the product hierarchical database is included in a header of the user database, the relationship between the product database and the user database will be retained. Also, if the user transfers the product database to a different computing device, the user database will not automatically be included in the transfer, although it optionally can be transferred with the product database. Keeping the product data separate from the user data preserves the privacy of the user's data, ensures that the product database integrity is not compromised, and prevents distribution of the registration number.

When a user selectively displays a different product database, the software will access a different user database that corresponds to the different product database, as a function of the registration number provided during registration of the different product database. By providing the opportunity for users to add used selected information to the data provided in a product hierarchical database, the users will be able to personalize the data displayed with the software and utilize its combined hierarchical and index search capability to access both the product database data and the related user database data. Registration of program used to access the databases is not a required element. But, it is contemplated that commercial products based on the present invention may also be distributed, and if so, registration may be required.

Figure 11:
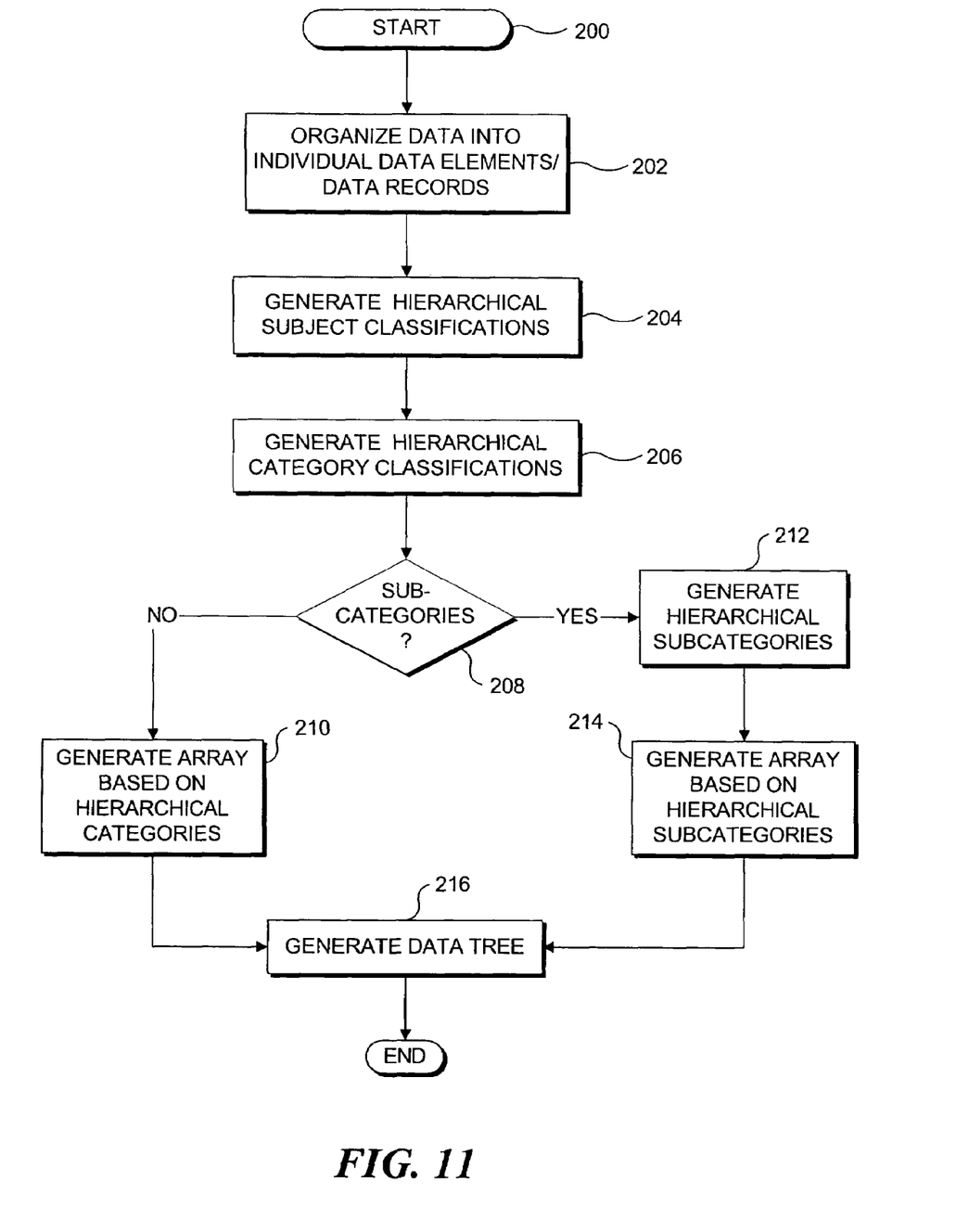
FIG. 11 is a block diagram illustrating a method for generating a dual data structure database in accord with the present invention.

FIG. 11 shows a block diagram of the steps employed to produce a database having a dual data structure in accord with the present invention. The logic starts in a block 200, and proceeds to a block 202 in which unorganized data are organized into individual data elements. For example, FIG. 8 shows a display of a record for one selected element, which includes the name of an airline, the telephone number for that airline, and the website address for that airline. FIG. 10 shows the bottom level of the data tree as being made of such data (i.e., the various fields of a record), which in at least one embodiment, will include names, phones numbers, and addresses. The specific composition of the information for a data element will be a function of the data being organized. Preferably each data element will include the data from the unorganized data that are most logically related. For example, if the unorganized data being organized includes the name of Restaurant X, the address of Restaurant X, the phone number of Restaurant X, the menu for Restaurant X, and the wine list for Restaurant X, then all of that data are logically related to each other and will be preferably incorporated into an individual data element (or database record).

Next, in a block 204, hierarchical subject classifications are generated, describing a top level of the hierarchical relationship among all of the data elements generated in block 202. In a block 206, a hierarchical level that is second from the top hierarchical level (i.e., the subject level) is generated. That second from the top level is preferably referred to as the category level.

Next, in a decision block 208, it is determined whether any additional levels are required to establish hierarchical relationships among all of the data elements generated in block 202. If additional levels are required, those levels are generated in a block 212. While the examples illustrated and described above include only a single subcategory level, it is contemplated that some groups of data might require additional hierarchically ordered subcategory levels. Particularly for databases that will be used for handheld portable computing devices (such as PDA's and cell phones), it is expected that in most cases, the hierarchical data will include only a single subcategory level, as it will be easier to navigate through fewer hierarchical levels, particularly in a device of compact size that cannot display a large amount of information on the display at one time.

Once the desired number of subcategory levels have been established, such that the desired hierarchical relationships among all of the data elements generated in block 202 have been established, the logic proceeds to a block 214, and an ordered array is generated on the lowest subcategory levels. As described above, a particularly useful way to order an array is by alphabetizing the contents of the lowest hierarchical subcategory level, although it is contemplated that other ordering paradigms might alternatively be applied. As noted above, the ordered array is preferably loaded into the memory in a sequential fashion based on the desired order. Also as described above, attributes defining a display sequential order can be associated with each element of the array, and the array can be ordered by manipulating such attributes.

Returning now to decision block 208, if no subcategories are required, the next step is described in a block 210, in which the ordered array is generated based on the contents of the category level generated in block 204. While not shown, it should be understood that a very small, simple set of unorganized data could be organized and described with only a single hierarchical level, such as a subject level. However, it is expected that more useful databases, containing larger volumes of data, will require at least subject and category hierarchical levels.

From both block 210 and block 214 (in each of which the ordered array is generated from a particular source), the next step is a block 216, in which the data tree of FIG. 10 is produced, including the pointers described above.

While it is important that the first step in the above process be organizing the data into data elements (or data records, see block 202), it should be understood that the order of the following steps can be somewhat changed. Generating hierarchical relationships among all of the data elements produced in block 202 is a somewhat subjective process. In some circumstances, it may be easier to produce the lowest hierarchical levels first, and then to generate intermediate levels, followed by the top levels. If such logic is employed, then once the hierarchy is established, it must be determined if the second lowest level in the hierarchy (that level immediately above the data elements that include the records, which as seen in FIG. 10 represents the bottom level of the hierarchy) is a category or a subcategory (analogous to decision block 208) to determine if the ordered array represents a category or a subcategory hierarchical level. Regardless of the order of blocks 204 and 206, the hierarchy must be complete before the ordered array can be produced.

As shown in FIG. 11, the ordered array is generated in either block 210 or block 214 before the data tree structure is completed in block 216. It should be understood that the data structure could be completed before the ordered array is.

It should be apparent from the above description that while it is anticipated many databases will include sufficient elements so that the hierarchical relationships among of the data elements will include subcategory levels, some databases may include no subcategory levels. Furthermore, there is no requirement that each branch of the hierarchical relationships describing the database be of the same depth. From a top hierarchical level, one particular subject's hierarchical relationships may include three different elements in a category level (i.e., at the second hierarchical level), four elements in a first subcategory level (i.e., at the third hierarchical level), and three elements in a second subcategory level (i.e., at the fourth hierarchical level). A different subject's hierarchical relationships may include, for example, four different elements at the category level (i.e., at the second hierarchical level), two different elements in a first subcategory level (i.e., at the third hierarchical level), and no elements in a second subcategory level (i.e., at the fourth hierarchical level).

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for organizing data into a database having a dual structure that facilitates locating desired information included in the database, comprising the steps of:
  (a) generating a tree data structure that defines a hierarchical relationship of the data, wherein the tree data structure includes a bottom level that is a database record level that includes detailed data, such that the desired information is stored on the lowest level, and a top level that is a subject level that classifies the data stored in the lowest level by subject; and
  (b) generating an ordered array structure of classifications of the data, wherein the ordered array structure comprises classifications linked to the bottom level that includes the detailed data, but not classifications linked to hierarchical levels that only further classify the data, said tree data structure and said ordered array structure enabling a user to respectively locate and display the desired information using either a hierarchical-based search or an index-based search, such that said dual structure comprises said tree data structure and said ordered array structure.

2. The method of claim 1, wherein an intermediate level of said hierarchical relationship of the data includes at least one member of a group consisting of a category level that classifies the detailed data in the bottom level by category, and a subcategory level that classifies the detailed data in the bottom level by subcategory.

3. The method of claim 1, wherein the step of generating the tree data structure comprises the step of providing at least one pointer from a node of the tree data structure to at least one of a first child, a next sibling, and a parent.

4. The method of claim 1, wherein the step of generating said ordered array structure comprises the step of organizing the classifications in a desired order.

5. The method of claim 4, wherein the step of organizing comprises the step of alphabetizing the classifications.

6. The method of claim 4, wherein the step of organizing comprises the step of storing said ordered array structure in a memory so as to achieve said desired order.

7. The method of claim 4, wherein the step of organizing comprises the step of providing an attribute to each classification of said ordered array structure, said attribute defining a position of each component in said ordered array structure, to determine an order with which each component of the ordered array structure is displayed.

8. A searchable database that is organized in a dual structure for enabling a user to more efficiently locate desired information, said dual structure comprising:
  (a) a first data structure that defines a hierarchical relationship of data included in the database, wherein a bottom level of said hierarchical relationship comprises a database record level where detailed data are stored, and a top level of said hierarchical relationship comprises a subject level that classifies the detailed data in the bottom level by subject; and
  (b) a second data structure that comprises an ordered array, wherein the ordered array comprises each classification of the data at a defined level of the hierarchical relationship, said defined level comprising a level immediately above the bottom level, said first data structure and said second data structure in the searchable database enabling a user to more efficiently locate and display desired information by selectively conducting either a hierarchical-based search or an index-based search, such that said dual structure comprises said first data structure and said second data structure.

9. The database of claim 8, wherein an intermediate level of said hierarchical relationship comprises at least one of a category level, and a subcategory level.

10. The database of claim 8, wherein the first data structure comprises at least one pointer associated with a node in the first data structure and pointing to at least one of a first child, a next sibling, and a parent, associated with the node.

11. The database of claim 8, wherein the defined level of the hierarchical relationship is a second lowest level of each branch of the first data structure.

12. The database of claim 8, wherein the ordered array is alphabetized.

13. The database of claim 8, wherein said ordered array includes an attribute associated with each component of the data comprising said ordered array, said attribute defining a position of each component in said ordered array, to determine an order with which each component of the ordered array is displayed to a user.

14. A method for organizing data into a database having a dual structure that facilitates locating desired information included in the database, comprising the steps of:
  (a) generating a tree data structure that defines a hierarchical relationship of the data, wherein the tree data structure includes a top level of said hierarchical relationship of the data that is a subject level classification for the data, sat least one intermediate level of said hierarchical relationship of the data that is a category level classification for the data, at least one additional intermediate level of said hierarchical relationship of the data that is a subcategory level classification for the data, and a bottom level that is a database record level that includes detailed data; and
  (b) generating an ordered array structure of classifications of the data elements included in the data by organizing selected subjects, categories, and subcategories of the data into a desired order, each selected subject to be added to the ordered array structure being associated with no lower level category, and each selected category to be added to the ordered array structure and each selected subcategory to be added to the ordered array structure being associated with no lower level subcategory, said tree data structure and said ordered array structure enabling a user to locate desired information using either a hierarchical-based search or an index-based search, such that said dual structure comprises said tree data structure and said ordered array structure.

15. The method of claim 14, further comprising the step of alphabetizing said selected subjects, categories, and subcategories to achieve the desired order.

* * * * *